(12) United States Patent
Martin et al.

(10) Patent No.: US 11,073,095 B2
(45) Date of Patent: Jul. 27, 2021

(54) METHOD AND SYSTEM FOR IMPROVING EXHAUST SYSTEM EFFICIENCY

(71) Applicant: Ford Global Technologies, LLC, Dearborn, MI (US)

(72) Inventors: Douglas Raymond Martin, Canton, MI (US); John Eric Rollinger, Troy, MI (US); Benjamin M. Rocci, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 15 days.

(21) Appl. No.: 16/565,408

(22) Filed: Sep. 9, 2019

(65) Prior Publication Data

US 2021/0071608 A1    Mar. 11, 2021

(51) Int. Cl.
  *F02D 41/02* (2006.01)
  *F02P 5/04* (2006.01)
  *F01N 11/00* (2006.01)

(52) U.S. Cl.
  CPC ........ *F02D 41/0255* (2013.01); *F01N 11/002* (2013.01); *F02D 41/025* (2013.01); *F02P 5/045* (2013.01); *F02D 2200/0802* (2013.01)

(58) Field of Classification Search
  CPC .... F02D 41/0235–0255; F02D 2200/08–0804; F02P 5/045; F01N 11/002; F01N 11/005; F01N 2900/1402; F01N 2900/1404; F01N 2900/1602; F01N 2900/1626; F01N 3/2006

USPC .. 60/272–274, 284–286, 294, 300, 303, 320
  See application file for complete search history.

(56) References Cited

U.S. PATENT DOCUMENTS

| | | | |
|---|---|---|---|
| 7,377,236 B2 | 5/2008 | Reed et al. | |
| 2007/0289295 A1* | 12/2007 | Miyashita | F01N 3/0842 60/300 |
| 2009/0126352 A1* | 5/2009 | Surnilla | F02D 41/0275 60/288 |
| 2016/0025021 A1* | 1/2016 | Hilditch | F02D 41/0052 60/274 |
| 2016/0115884 A1* | 4/2016 | VanDerWege | F02D 41/1446 123/481 |
| 2016/0265466 A1* | 9/2016 | Suzuki | F01N 3/10 |
| 2017/0145946 A1* | 5/2017 | Korenaga | F02D 41/008 |
| 2018/0244274 A1* | 8/2018 | Katayama | B60W 10/026 |

* cited by examiner

*Primary Examiner* — Mark A Laurenzi
*Assistant Examiner* — Mickey H France
(74) *Attorney, Agent, or Firm* — Geoffrey Brumbaugh; McCoy Russell LLP

(57) ABSTRACT

Methods and systems are provided for improving efficiency of an exhaust gas after treatment system of a vehicle. In one example, a first group of engine cylinders is operated with a rich air-fuel ratio continuously while a second group of engine cylinders is operated with a lean air-fuel ratio continuously. The rich and lean exhaust gases from the two groups of engine cylinders may be oxidized within an exhaust gas after treatment system to improve catalyst efficiency.

21 Claims, 4 Drawing Sheets

METHOD AND SYSTEM FOR IMPROVING EXHAUST SYSTEM EFFICIENCY

FIELD

The present application relates to methods and systems for improving efficiency of an engine exhaust gas after treatment system. The system and method may improve efficiency of the engine exhaust gas after treatment system via reducing an amount of time to reach a light off temperature of the engine exhaust gas after treatment system.

BACKGROUND/SUMMARY

An internal combustion engine may include an exhaust gas after treatment system for processing engine exhaust gases. The exhaust gas after treatment system's efficiency may be temperature dependent and the exhaust gas after treatment system's efficiency may increase as the exhaust gas after treatment system's temperature increases up to a threshold temperature. Therefore, after a cold engine start, efficiency of the exhaust gas after treatment system may be increased by causing the exhaust gas after treatment system to reach the threshold temperature sooner after an engine cold start. However, the engine's exhaust gases may not be of sufficient temperature after an engine cold start to increase the exhaust gas after treatment system's efficiency as soon as may be desired to reduce engine emissions as much as may be desired. Therefore, it may be desired to provide a way of increasing efficiency of an exhaust gas after treatment system in a reduced amount of time, thereby reducing engine tailpipe emissions.

The inventors herein have recognized that it may be desirable to increase engine exhaust system efficiency and have developed an engine operating method, comprising: operating at least one engine cylinder with a rich air-fuel ratio continuously for a plurality of engine cycles and operating at least one engine cylinder with a lean air-fuel ratio continuously for the plurality of engine cycles via a controller in response to an exhaust gas after treatment temperature being less than a threshold temperature, where the rich air-fuel ratio is a function of an amount of heat flux requested to be delivered to an exhaust gas after treatment system.

By adjusting a rich air-fuel ratio of a group of cylinders as a function of an amount of heat flux requested to be delivered to an exhaust gas after treatment system, it may be possible to provide the technical result of improving catalyst efficiency via reducing an amount of time it takes for a catalyst to reach a light off or threshold operating temperature. Reducing the amount of time it takes the catalyst to reach the light off or threshold temperature may increase catalyst efficiency over the course of an engine operating period. The catalyst temperature may be increased via oxidizing hydrocarbons contained in exhaust gases at the catalyst. The hydrocarbons may be oxidized via oxygen contained in exhaust gases supplied from cylinders operating at a lean air-fuel ratio. Further, the engine's overall air-fuel ratio may be on average a stoichiometric air-fuel ratio so that catalyst efficiency may be high.

The system and method described herein may provide several advantages. Specifically, the method and system described herein may improve catalyst efficiency. Further, the system and method may be applied to more than one engine type. Further still, the system and method may improve catalyst efficiency without increasing system cost.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
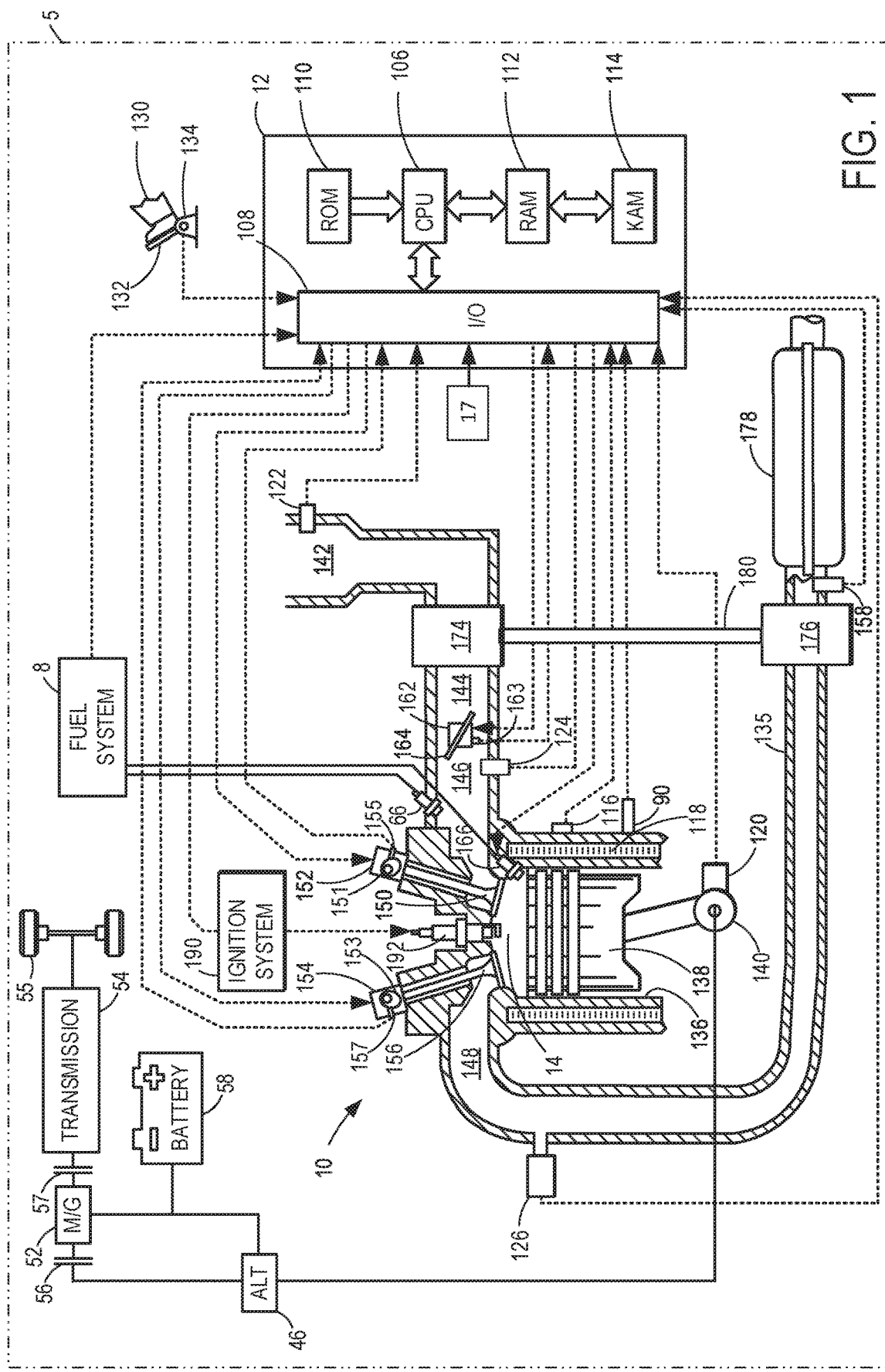
FIG. 1 shows a schematic depiction of an engine system of a vehicle.
Figure 3:
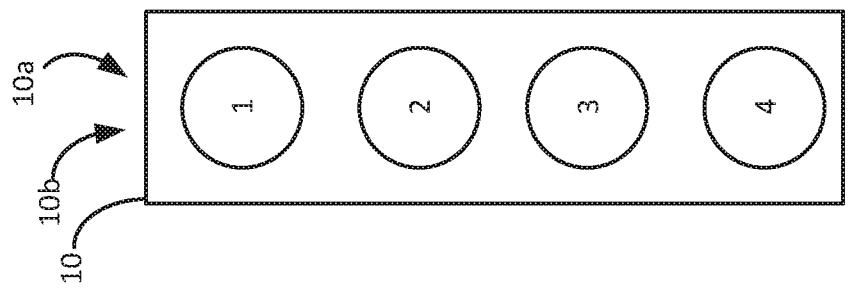
FIGS. 2 and 3 show two different engine block configuration for the engine shown in FIG. 1.
Figure 2:
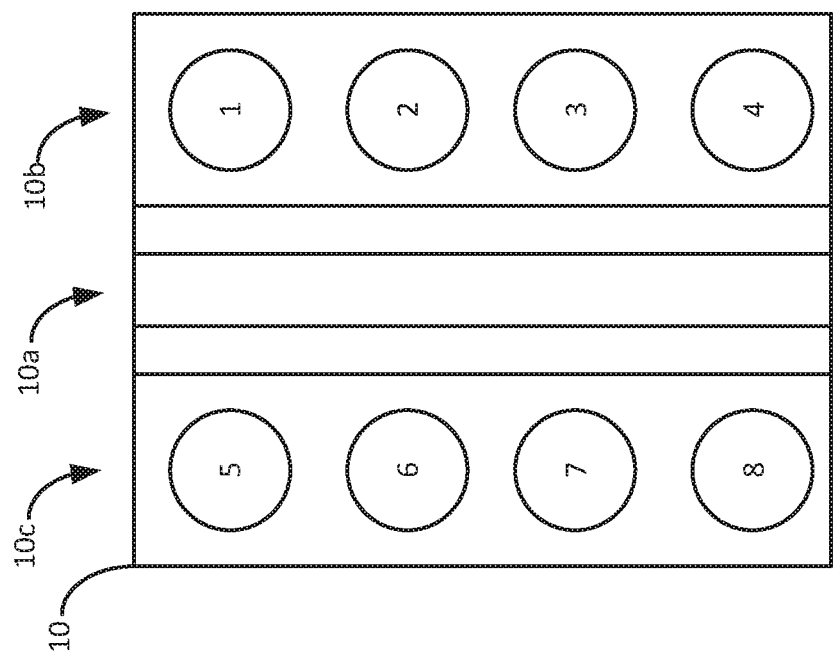

The following description relates to systems and methods for improving efficiency of an exhaust system of an engine. The engine may be of the type that is shown in FIGS. 1-3. The engine may be operated according to the sequence of FIG. 4. Air-fuel ratios of the engine's cylinders may be adjusted to increase oxidation of hydrocarbons entering a catalyst so that the catalyst temperature increases, thereby increasing the catalyst's efficiency. One group of cylinders provides oxygen to the catalyst while another group of cylinders provides hydrocarbons to the catalyst. On average, exhaust gas constituents are equivalent to combusting a stoichiometric air-fuel mixture in the engine. FIG. 5 shows a method for operating the system of FIGS. 1-3 to generate the sequence of FIG. 4.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 and 57 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. Controller 12 may also receive input and provide output to human/machine interface 17. Human/machine interface 17 may accept human driver input requests to start the vehicle and the engine. Human/machine interface 17 may also provide diagnostic information to a human. Human/machine interface 17 may be a touch screen display, pushbutton, key switch, or other known type of human/machine interface.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 2, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine 10 includes a first bank of cylinders 10b including cylinders numbered 1-4. Engine 10 includes a second bank of cylinders 10c including cylinders numbered 5-8. Exhaust gasses from first bank of cylinders 10b may be directed to a first exhaust catalyst and exhaust gasses from second bank of cylinders 10c may be directed to a second catalyst.

Referring now to FIG. 3, a front view of engine 10 is shown. In this example, engine 10 includes only a single bank of cylinders 10b. Cylinder number one is positioned at the front 10a of cylinder bank 10b. Exhaust gasses from cylinders 1-4 may be directed to a catalyst 178 as shown in FIG. 1.

Thus, the system of FIGS. 1-3 provides for a system for operating an engine, comprising: an engine including an exhaust gas after treatment system; and a controller including executable instructions stored in non-transitory memory to operate a first actual total number of engine cylinders with a rich air-fuel ratio continuously for a plurality of engine cycles and operate a second actual total number of engine cylinders with a lean air-fuel ratio continuously for the plurality of engine cycles, where the first actual total number of engine cylinders is based on an amount of heat flux requested to be delivered to the exhaust gas after treatment system. The system includes where the second actual total number of engine cylinders is based on the amount of heat flux requested to be delivered to the exhaust gas after treatment system.

In one example, the system further comprises additional instructions to adjust spark timing of the first actual total number of engine cylinders differently from spark timing of the second actual total number of engine cylinders. The system includes where the first actual total number of cylinders is equal to the second actual total number of cylinders. The system includes where the first actual total number of cylinders is greater than the second actual total number of cylinders. The system includes where the first actual total number of cylinders is less than the second actual total number of cylinders. The system further comprises additional instructions to operate the engine with an on average stoichiometric air-fuel ratio. The system further comprises additional instructions to operate the first actual total number of engine cylinders with an oscillating rich to lean and lean to rich air fuel ratio in response to a catalyst temperature exceeding a threshold temperature.

Figure 4:
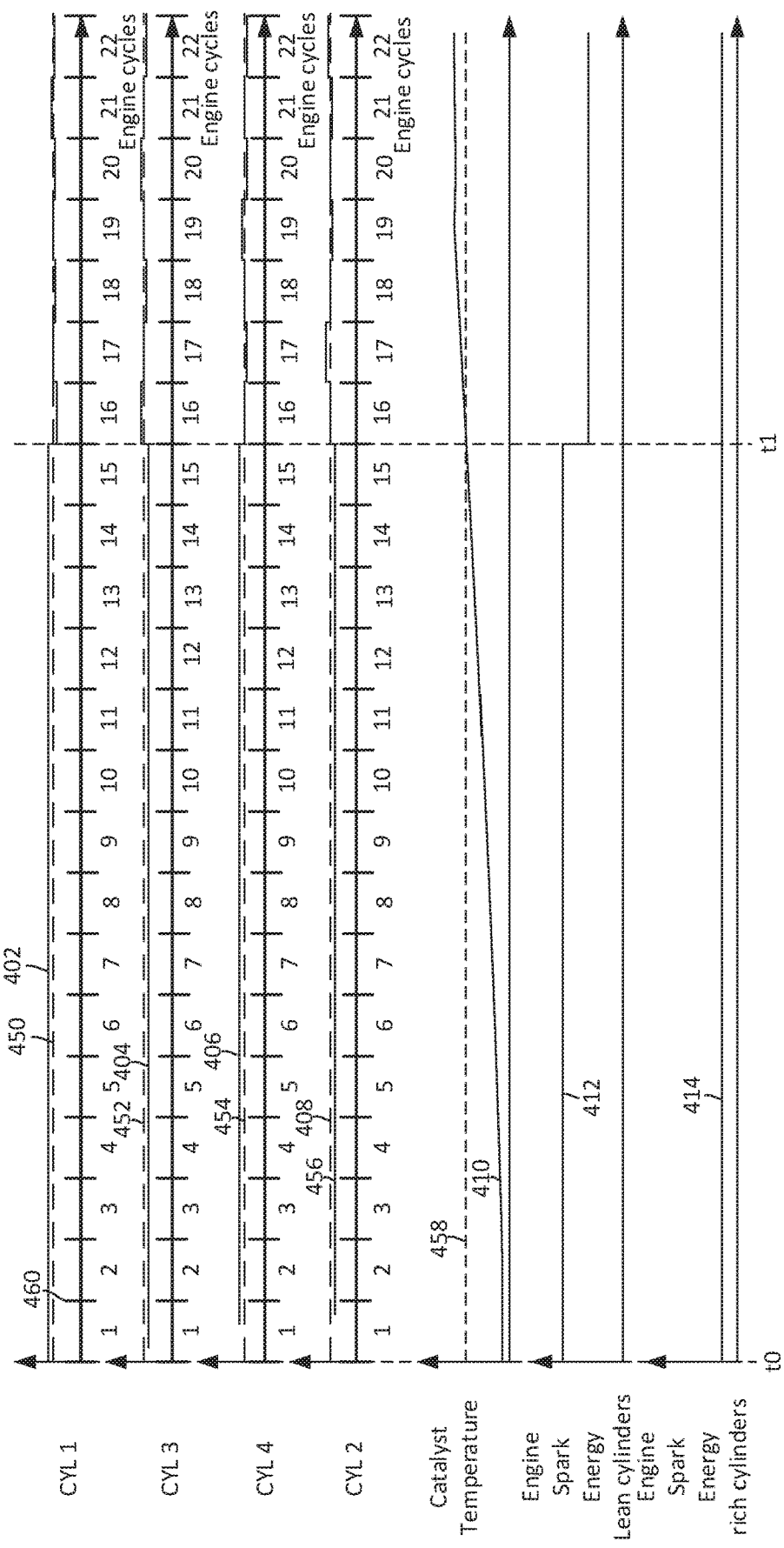
FIG. 4 shows an example engine operating sequence for the system of FIGS. 1-3.
Figure 5:
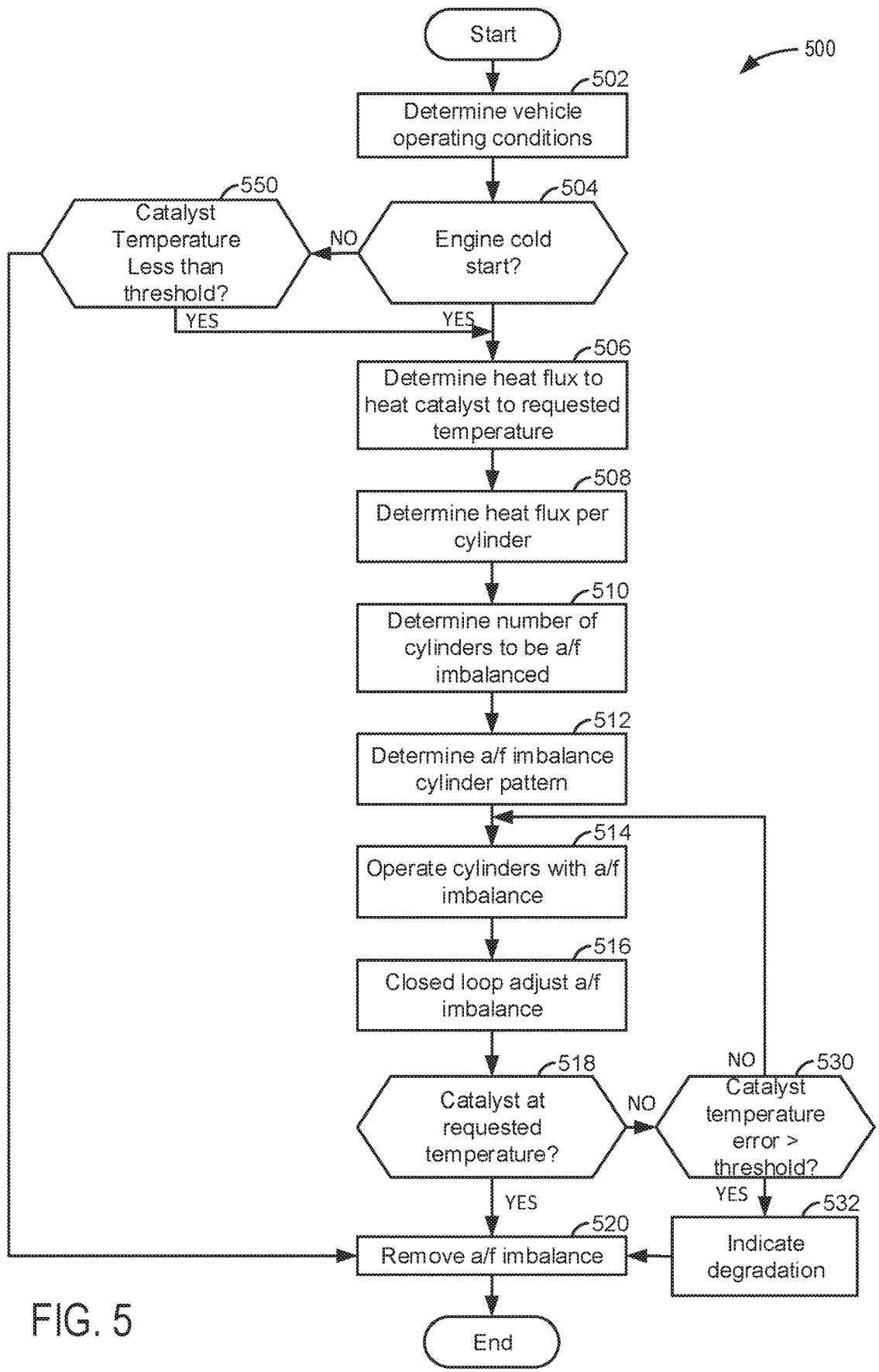
FIG. 5 shows method for operating the system of FIGS. 1-3.

Referring now to FIG. 4, an example engine operating sequence is shown. The sequence of FIG. 4 may be provided via the system of FIGS. 1-3 in cooperation with the method of FIG. 5. The plots in FIG. 4 are aligned in time and the plots occur at the same time. The vertical lines at time t0 and time t1 represent times of interest in the sequence. The sequence of FIG. 4 is for a four stroke four cylinder engine having a firing order of 1-3-4-2.

The first plot from the top of FIG. 4 is a plot of cylinder number one air-fuel ratio versus engine cycle. The vertical axis represents cylinder number one air-fuel ratio and the engine air-fuel ratio increases in the direction of the vertical axis arrow. The horizontal axis represents engine cycles and the actual total number of engine cycles since a most recent engine stop begin with a vertical line and end with a vertical line. For example, vertical line 460 represents the end of engine cycle one and the beginning of engine cycle two. Horizontal line 450 represents a stoichiometric air-fuel ratio. Trace 402 represents the air-fuel ratio of cylinder number one.

The second plot from the top of FIG. 4 is a plot of cylinder number three air-fuel ratio versus engine cycle. The vertical axis represents cylinder number three air-fuel ratio and the engine air-fuel ratio increases in the direction of the vertical axis arrow. The horizontal axis represents engine cycles and the actual total number of engine cycles since a most recent engine stop begin with a vertical line and end with a vertical line. Horizontal line 452 represents a stoichiometric air-fuel ratio. Trace 404 represents the air-fuel ratio of cylinder number three.

The third plot from the top of FIG. 4 is a plot of cylinder number four air-fuel ratio versus engine cycle. The vertical axis represents cylinder number four air-fuel ratio and the engine air-fuel ratio increases in the direction of the vertical axis arrow. The horizontal axis represents engine cycles and the actual total number of engine cycles since a most recent engine stop begin with a vertical line and end with a vertical line. Horizontal line 454 represents a stoichiometric air-fuel ratio. Trace 406 represents the air-fuel ratio of cylinder number four.

The fourth plot from the top of FIG. 4 is a plot of cylinder number one air-fuel ratio versus engine cycle. The vertical axis represents cylinder number two air-fuel ratio and the engine air-fuel ratio increases in the direction of the vertical axis arrow. The horizontal axis represents engine cycles and the actual total number of engine cycles since a most recent engine stop begin with a vertical line and end with a vertical line. Horizontal line 456 represents a stoichiometric air-fuel ratio. Trace 408 represents the air-fuel ratio of cylinder number two.

In the first four plots, traces of air-fuel ratios that are above stoichiometric air-fuel ratios represent cylinders that are operating lean. Traces of air-fuel ratios that are below the stoichiometric air-fuel ratios represent cylinders that are operating rich.

The fifth plot from the top of FIG. 4 is a plot of catalyst temperature versus engine cycle. The vertical axis represents catalyst temperature and catalyst temperature increases in the direction of the vertical axis arrow. The horizontal axis represents engine cycles and the actual total number of engine cycles since a most recent engine stop begin with a vertical line and end with a vertical line. Horizontal line 458 represents a catalyst light off temperature or a catalyst threshold temperature. Trace 410 represents the catalyst temperature.

The sixth plot from the top of FIG. 5 is a plot of engine spark energy in cylinders with lean air-fuel ratios versus engine cycle. The vertical axis represents engine spark energy and engine spark energy increases in the direction of the vertical axis arrow. Trace 412 represents the spark energy for cylinders with lean air-fuel ratios.

The seventh plot from the top of FIG. 5 is a plot of engine spark energy in cylinders with rich air-fuel ratios versus engine cycle. The vertical axis represents engine spark energy and engine spark energy increases in the direction of the vertical axis arrow. Trace 414 represents the spark energy for cylinders with rich air-fuel ratios.

At time t0, the engine is stopped and catalyst temperature is low. The engine is not receiving spark and the engine is not rotated. Shortly after and to the right of time t0, an engine start is requested (not shown). The engine is rotated via a starter (not shown) and fuel injection to the engine begins. The engine is positioned with cylinder number one on its intake stroke and cylinder number one is the first cylinder to receive fuel after engine cranking via the starter motor begins. The air-fuel ratio of cylinder number one is adjusted to a lean air-fuel mixture beginning with the first cycle of the engine since the most recent engine stop at time t0. As the engine rotates, fuel is injected next into cylinder number three. The air-fuel ratio of cylinder number three is rich. The engine continues to rotate and fuel is injected next into cylinder number four. The air-fuel ratio of cylinder number four is lean. Finally during the first engine cycle, fuel is injected to cylinder number two. The air-fuel ratio of cylinder number two is lean. The combined engine air-fuel ratio for all engine cylinders is a stoichiometric air-fuel ratio. The catalyst temperature is low and it begins to increase. The engine spark energy of the lean cylinders is a high level to reduce the possibility of engine misfire. The engine spark energy of the lean cylinders is a medium level.

Between time t0 and time t1, cylinder numbers one and four continue to operate with lean air-fuel mixtures and the engine accelerates. Cylinder numbers two and three continue to operate with rich air-fuel mixtures. The catalyst temperature continues to increase and the spark energy levels of rich cylinders and lean cylinders remain unchanged. The engine air-fuel ratio causes the catalyst temperature to increase at an accelerated rate to improve catalyst efficiency.

At time t2, catalyst temperature exceeds threshold temperature 458. The air-fuel ratio of each engine cylinder is controlled to oscillate between rich and lean air-fuel ratios. Further, the spark energy of each cylinder is adjusted to a middle level. Thus, the engine begins to operate in a standard closed loop air-fuel control mode.

In this example, the engine begins to operate via combusting a first air-fuel mixture since the most recent engine stop (e.g., engine not rotating and not combusting fuel) that is a lean air-fuel mixture. By operating the first cylinder since the most recent engine stop with a lean air-fuel ratio, it may be possible to reduce engine tailpipe hydrocarbon emissions and reduce catalyst light off time. The engine cylinders that are operated with a rich air-fuel ratio (e.g., cylinder numbers three and four) do not fire until a second combustion event since the most recent engine stop so that hydrocarbons do not encounter the catalyst until the catalyst has been heated via exhaust gases from a lean air-fuel mixture. This may reduce catalyst light off time and reduce engine emissions. Thus, in this example, exhaust gases from at least one lean combustion event in a cylinder warms the catalyst before exhaust gases from a rich combustion event reach the catalyst so that catalyst light off time may be reduced.

In other examples, the engine may begin to operate via combusting a lean air-fuel mixture in all engine cylinders for a predetermined number of combustion events (e.g., a combustion event is combustion of air and fuel in a cylinder) since the most recent engine stop (e.g., engine not rotating and not combusting fuel). By operating the engine with all engine cylinders having lean air-fuel ratios, it may be possible to reduce engine tailpipe hydrocarbon emissions and reduce catalyst light off time. After the predetermined number of combustion events, a fraction of the engine's cylinders are operated with a rich air-fuel ratio to accelerate catalyst light off time. After the predetermined number of combustion events, a fraction of the engine's cylinders continue to combust lean air-fuel mixtures. In addition, a fraction of the engine's cylinders may operate with a stoichiometric air-fuel mixture after the predetermined number of combustion events. Such operation may reduce catalyst light off time and reduce engine emissions. Thus, in this example, exhaust gases from a plurality of lean combustion events warm the catalyst before exhaust gases from a rich combustion event reach the catalyst so that catalyst light off time may be reduced.

Referring now to FIG. 5, a method for operating an engine and reducing an amount of time for a catalyst to reach a requested or desired temperature is shown. At least portions of method 500 may be implemented as executable controller instructions stored in non-transitory memory. Method 500 may operate in cooperation with the system of FIGS. 1-3. Additionally, portions of method 500 may be actions taken in the physical world to transform an operating state of an actuator or device.

At 502, method 500 determines vehicle operating conditions. Vehicle operating conditions may include but are not limited to engine speed, engine temperature, catalyst temperature, ambient temperature, ambient pressure, engine air flow amount, and engine air-fuel ratio. The operating conditions may be determined via the controller and the various sensors that are coupled to the controller. Method 500 proceeds to 504.

At 504, method 500 judges if there is a request to cold start the engine. Method 500 may judge that there is a cold start request to start the engine if controller 12 receives input from a human/machine interface. Alternatively, controller 12 may automatically generate an engine start request in response to inputs. If method 500 judges that there is an engine start request, the answer is yes and method 500 proceeds to 506. Otherwise, the answer is no and method 500 proceeds to 550.

At 550, method 500 judges if a catalyst temperature is less than a threshold temperature. In one example, the threshold temperature is a temperature at which catalyst efficiency may reach a predetermined level (e.g., 50% efficiency). If method 500 judges that catalyst temperature is less than the threshold temperature, the answer is yes and method 500 proceeds to 506. Otherwise, the answer is no and method 500 proceeds to 520.

At 506, method 500 determines a heat flux amount for heating the catalyst or another exhaust system component to a desired or requested temperature. The heat flux amount is flow of energy per unit of area per unit of time (e.g., kilowatts/meter$^2$). The area may be the frontal surface area of the catalyst, outlet of the engine exhaust manifold, or the exhaust component that is being heated. The heat flux amount to heat a catalyst to a requested temperature may be empirically determined from an initial temperature of the object or device being heated (e.g., catalyst), generating different amounts of heat flux via the engine and supplying heat flux to the object or device being heated, and measuring an amount of time it takes from a time when the heat flux is first directed to the object being heated to a time that the object reaches the requested temperature. The amount of thermal energy delivered to the device being heated may be determined via a temperature sensor and a flow rate sensor (e.g., engine mass air flow rate sensor). The heat flux amount for heating the catalyst or exhaust system component may be stored in a table or function in controller memory. The table or function may be referenced via the initial temperature of the catalyst and the table outputs an empirically determined heat flux amount for heating the catalyst or another exhaust system component to a desired or requested temperature. There may be unique heat flux amounts for each cylinder bank. Thus, there may be one or more functions for determining heat flux for an exhaust system that includes two banks of cylinders. For example, the table or function may output a value of 2 kilowatts to heat a catalyst from 20° C. to 550° C. in a time period of 20 seconds. It should be noted that the catalyst need not be the most upstream (e.g., catalyst that is closest to the engine) catalyst to determine the heat flux to heat the catalyst or exhaust system component to a requested temperature (e.g., a catalyst light off temperature). Method 500 proceeds to 508 after determining the requested heat flux.

At 508, determines an amount of heat flux that may be produced via one cylinder operating with a rich air-fuel ratio. In particular, method 500 references a table or function of empirically determined heat flux values for cylinders that are based on amounts of hydrocarbons that do not participate in combustion within a cylinder after combustion occurs in a cylinder. For example, if a cylinder receives an air-fuel ratio at a rich combustion limit of 12:1, where a stoichiometric air-fuel ratio is 14.6:1, at 0.3 load and idle speed, the cylinder may expel un-combusted hydrocarbons that may generate a maximum of 0.5 kilowatts in twenty seconds at the catalyst. The heat flux amount that may be generated via air-fuel ratio imbalance may be empirically determined via measuring a temperature rise at the catalyst or exhaust system component when the engine is operated with an air-fuel imbalance. Heat flux amounts for an engine cylinder operating with the engine at various speeds, loads, and rich limit air-fuel ratios are stored in a table or function in controller memory. The table or function may be referenced or indexed via engine speed and engine load. The table outputs a maximum heat flux for operating a cylinder imbalanced with an air-fuel ratio that is a rich limit air-fuel ratio (e.g., the cylinder air-fuel ratio is not permitted to be lower than the rich limit air-fuel ratio) at the present engine speed and engine load. This is the maximum heat flux amount that may be provided per cylinder that is operating with the rich air-fuel ratio imbalance. The present engine speed and load may be a predetermined engine speed and load for engine cold start conditions (e.g., engine speed=1100 RPM at 0.35 engine load). Method 500 proceeds to 510.

At 510, method 500 determines a total number of engine cylinders to generate a portion of heat flux that is provided to the catalyst or exhaust system component via air-fuel ratio imbalance between the engine's cylinders. The air-fuel imbalance may be described as an air-fuel ratio difference between engine cylinders. For example, some engine cylinders may be operated with a rich air-fuel ratio while other cylinders are operated with a lean air-fuel ratio. Excess hydrocarbons that did not participate in combustion in the engine's cylinders may be oxidized in the exhaust system via excess oxygen that did not participate in combustion in the engine's cylinders to increase heat flux provided to the catalyst or exhaust system component.

In one example, method 500 determines an amount of heat flux that may be provided via the engine operating with a maximum amount of spark retard at engine idle speed and a predetermined engine load (e.g., engine load between 0.3 and 0.4). Method 500 may reference a table or function of empirically determined engine heat flux output values for an engine that is operating with cylinders combusting stoichiometric air-fuel ratios at engine idle speed. The table or function may be referenced via engine load and spark timing values for engine cold start conditions or present engine operating conditions. The table or function outputs a heat flux amount that may be provided via the heat in the engine's exhaust gases. This may be referred to as the spark retard only heat flux. If the spark retard only heat flux is less than the heat flux determined at 506, then the difference between the heat flux determined at 506 minus the spark only heat flux is the heat flux to be generated via cylinder air-fuel ratio imbalance. For example, if spark retard only heat flux may provide 1 kilowatts of 2 kilowatts requested in a specified time frame, then 1 kilowatts of heat flux is requested to be generated via cylinder air-fuel ratio imbalance in the time frame.

Once the heat flux short fall is determined by subtracting the spark only heat flux from the heat flux to heat the catalyst or exhaust component to the requested temperature in the specified time frame, then the number of cylinders to operate rich air-fuel ratio imbalanced is determined by dividing the result by the maximum amount of heat flux that may be produced via one cylinder operating with a rich air-fuel ratio during the time frame. For example, if the total heat flux in a specified time frame is 2 kilowatts and the spark retard only heat flux is 1 kilowatt in the time frame, then 1 kilowatt of heat flux (e.g., 2 kilowatts-1 kilowatt) may be provided via two cylinders (1 kilowatt/0.5 kilowatts per cylinder) in the specified time frame via air-fuel imbalance. Conversely, if 1.1 kilowatts of heat flux is needed to be generated via air-fuel ratio imbalance, then the 1.1 kilowatts may be provided via three cylinders (1.1 kilowatt/0.5 kilowatts per cylinder (maximum heat flux per cylinder at the present engine speed and load)=2.2, which rounds up to a nearest whole number of three).

The amount of heat flux that is to be provided via each cylinder is the heat flux that is needed to be generated via air-fuel ratio imbalance divided by the number of cylinders providing the air-fuel ratio imbalance heat flux. For example, if 1.1 kilowatts of heat flux is needed to be generated via air-fuel ratio imbalance in a specified time frame, and if it takes three engine cylinders to provide the requested heat flux via air-fuel ratio imbalance (e.g., 1.1 kilowatt/0.5 kilowatts per cylinder (maximum heat flux per cylinder at the present engine speed and load)=3 (rounded up)), the amount of heat flux that is to be provided per cylinder is 1.1 kilowatt/3=0.366 kilowatts per cylinder.

In this way, the heat flux that is to be generated via cylinder air-fuel ratio imbalance may be generated with a fewest number of engine cylinders operating with a rich air-fuel ratio imbalance. Method 500 proceeds to 512.

At 512, method 500 determines a pattern of cylinders to operate with the rich air-fuel ratio imbalance if the heat flux cannot be achieved via only adjusting spark timing. In one example, rich air-fuel ratios supplied to cylinders of a cylinder bank of an engine are supplies so that rich air-fuel ratios are evenly distributed for the cylinder bank. For example, if the engine is a four cylinder engine having a firing order of 1-3-4-2 and two cylinders having rich air-fuel ratios are needed to generate the requested heat flux, then cylinders one and four, or cylinders three and two may be selected to receive the rich air-fuel ratios since there is 180 crankshaft degrees between each cylinder combustion event and 360 crankshaft degrees between combustion events in cylinders that receive rich air-fuel mixtures. Thus, exhaust gases flowing to the catalyst may be lean followed by rich, followed by lean, followed by rich, and so on. Consequently over an engine cycle (e.g., two revolutions for a four stroke engine), rich exhaust gas is delivered to the catalyst every 360 crankshaft degrees. Further, lean exhaust gases are delivered to the catalyst between each time rich exhaust gas is delivered to the catalyst. This helps to ensure that there is sufficient oxygen to oxidize the hydrocarbons that were delivered to the catalyst via the rich air-fuel exhaust gases.

If the engine is a V8 or a V6 with two banks of cylinders, then the rich air-fuel ratios supplied to cylinders of a cylinder bank of an engine are supplies so that rich air-fuel ratios are as evenly distributed as possible for the cylinder bank. For example, if the engine is an eight cylinder engine having a firing order of 1-5-4-8-6-3-7-2 and cylinders 1-4 are on one cylinder bank, then cylinders 1 and 3, or cylinders 2 and 4 may be selected to receive rich air-fuel ratios to generate the requested heat flux. Cylinders 5 and 6, or cylinders 7 and 8, may be selected to receive the rich air-fuel mixture for the other cylinder bank. Method 500 proceeds to 514.

At 514, method 500 operates the total number of cylinders determined to be operated with rich air-fuel mixtures to provide the heat flux that is to be provided per cylinder as described at 510. For example, method 500 may operate each cylinder to provide 0.366 kilowatts of power (e.g., is 1.1 kilowatt/3 rich operating cylinders=0.366 kilowatts per cylinder) in the specified exhaust component or catalyst heating time frame. In one example, the engine's present load, speed, and the requested heat flux per cylinder reference a table and the table outputs an air-fuel ratio for operating the rich cylinders. For example, for heat flux of 0.366 kilowatts at engine speed of 1100 RPM and engine load of 0.35, the table may output an air-fuel ratio of 13:1. The values in the table may decrease as the heat flux amount increases. The engine air-fuel ratio values that are stored in the table and output by the table may be empirically determined via operating the engine on a dynamometer and adjusting cylinder air-fuel ratio while monitoring temperature at a catalyst at varying engine speeds and loads. Method 500 operates the total number of cylinders operating with the rich air-fuel ratio at the air-fuel ratio output via the table. The engine cylinders may be operated with the rich air-fuel ratio continuously for a plurality of engine cycles. Further, if the engine is being cold started, all engine cylinders may be operated with lean air-fuel mixtures for a predetermined number of combustion events before selected cylinders are operated with rich air-fuel mixtures so that rich exhaust gases may encounter lean conditions at the catalyst. In addition, operating the cylinders lean for a predetermined number of combustion events may reduce the possibility of the catalyst being cooled via rich exhaust gases. Once the predetermined number of combustion events is exceeded, the engine may be operated with a group of cylinders receiving rich air-fuel mixtures to accelerate catalyst temperature increase.

Method 500 also operates cylinders with lean air-fuel ratios so that the overall engine air-fuel ratio is a stoichiometric air-fuel ratio. For example, if two engine cylinders of a cylinder bank are operating with a 13:1 air-fuel ratio, then two other cylinders of the engine may be operated with 16.2:1 air-fuel ratios so that the overall average air-fuel ratio of cylinders of the cylinder bank is 14.6:1 (e.g., a stoichiometric air-fuel ratio). Similar to cylinders operating rich, cylinders operating lean may be constrained to operating with an air-fuel ratio that is less than a lean threshold air-fuel ratio (e.g., 17:1). Method 500 may operate with as few of cylinders as is possible with lean air-fuel ratios to make the average engine air-fuel ratio a stoichiometric air-fuel ratio. Consequently, lean operating cylinders may reach a lean air-fuel limit before additional engine cylinders may be operated lean to ensure the engine's air-fuel ratio is a stoichiometric air-fuel ratio. The engine cylinders may be operated with the lean air-fuel ratio continuously for a plurality of engine cycles. The total number of engine cylinders operating with the rich air-fuel ratio may be less than the total number of engine cylinders operating with the rich air-fuel ratio because the engine may be less tolerant of operating lean.

Method 500 may also adjust spark timing and spark energy in response to operating the engine with the air-fuel ratio imbalance. For example, method 500 may increase an amount of spark energy that is supplied to cylinders operating with a lean air-fuel ratio to reduce the possibility of engine misfire. Further, method 500 may retard spark timing from base spark timing so that engine cylinder provide the spark retard only heat flux. Method 500 proceeds to 516.

Method 500 may also increase engine load such that the load of each engine cylinder increases responsive to the requested heat flux amount. In one example, a function of empirically determined requested engine load values is referenced or indexed via the requested heat flux amount.

The function outputs engine load values corresponding to the requested heat flux amount. Therefore, if the heat flux amount increases the engine load may be increased and vice-versa. The engine load may be adjusted via adjusting throttle and valve timing.

At 516, method 500 adjusts operation of cylinders having rich air-fuel ratios such that the desired heat flux is generated. In particular, if method 500 judges that the engine does not provide a requested heat flux amount in the specified time frame, then method 500 may richen air-fuel ratios of engine cylinders that are operating with rich air-fuel ratios in response to a difference in the requested catalyst temperature minus the actual catalyst temperature. The richer air-fuel mixtures may allow additional heat to be generated in the exhaust system. The air-fuel ratios of cylinders operating with lean air-fuel mixtures may also be made leaner so that the engine's average air-fuel ratio remains a stoichiometric air-fuel ratio. Thus, the richness of cylinders operating with rich air-fuel mixtures may be closed loop controlled in response to heat flux observed within the exhaust system. Method 500 proceeds to 518.

At 518, method 500 judges if the catalyst or exhaust component is at a requested threshold temperature. If so, the answer is yes and method 500 proceeds to 520. Otherwise, the answer is no, and method 500 proceeds to 530.

At 520, method 500 removes the air-fuel imbalance from cylinders that are operating rich and cylinders that are operating lean. Method 500 may adjust the air-fuel ratios of all engine cylinders to oscillate about a stoichiometric air-fuel ratio. Method 500 also operates the engine cylinders with base spark timing. Method 500 proceeds to exit.

At 530, method 500 judges if a catalyst temperature error is greater than a threshold. The catalyst error may be determined via subtracting an actual catalyst temperature from an expected catalyst temperature. The expected catalyst temperature may be empirically determined and stored in controller memory. The expected catalyst temperature may be determined via adjusting the air-fuel ratio of cylinders that are operating rich and monitoring catalyst temperature. If method 500 judges that catalyst temperature error is greater than a threshold, the answer is yes and method 500 proceeds to 532. Otherwise, the answer is no and method 500 returns to 514, or alternatively to 506.

At 532, method 500 indicates degradation of the catalyst heating system. The degradation may be caused by injecting less fuel to the engine than is expected or other conditions. Method 500 proceeds to 520.

In this way, it may be possible to provide increased catalyst and exhaust component heating so that catalyst efficiency may be improved. Further, the heat flux that is generated via the engine and engine air-fuel ratio control may be adjusted so that catalyst heating matches a target catalyst heating.

Thus, the method of FIG. 5 provides for an engine operating method, comprising: operating at least one engine cylinder with a rich air-fuel ratio continuously for a plurality of engine cycles and operating at least one engine cylinder with a lean air-fuel ratio continuously for the plurality of engine cycles via a controller in response to an exhaust gas after treatment temperature being less than a threshold temperature, where the rich air-fuel ratio is a function of an amount of heat flux requested to be delivered to an exhaust gas after treatment system. The method includes where the richness of the rich air-fuel ratio is increased as the amount of heat flux requested increases. The method includes where the richness of the rich air-fuel ratio is decreased as the amount of heat flux requested decreases. The method further comprises increasing a load of the at least one engine cylinder with the rich air-fuel ratio as the amount of heat flux requested increases. The method further comprises decreasing a load of the at least one engine cylinder with the rich air-fuel ratio as the amount of heat flux requested increases. The method includes where the amount of heat flux requested is based on an initial temperature of the exhaust gas after treatment system. The method includes where the amount of heat flux requested is based on a cylinder bank of an engine.

The method of FIG. 5 also provides for an engine operating method, comprising: operating a first actual total number of engine cylinders with a rich air-fuel ratio continuously for a plurality of engine cycles and operating a second actual total number of engine cylinders with a lean air-fuel ratio continuously for the plurality of engine cycles via a controller in response to an exhaust gas after treatment temperature being less than a threshold temperature, and adjusting a pattern of the first actual number of engine cylinders in response to an amount of heat flux requested to be delivered to an exhaust gas after treatment system. The method further comprises adjusting a pattern of the second actual number of engine cylinders in response to an amount of heat flux requested to be delivered to the exhaust gas after treatment system. The method further comprises adjusting a load of the first actual total number of engine cylinders in response to the amount of heat flux requested to be delivered to the exhaust gas after treatment system. The method further comprises adjusting a load of the second actual total number of engine cylinders in response to the amount of heat flux requested to be delivered to the exhaust gas after treatment system. The method further comprises adjusting the richness of the rich air-fuel ratio in response to the amount of heat flux requested to be delivered to the exhaust gas after treatment system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An operating method for an engine, comprising:
operating at least one engine cylinder with a rich air-fuel ratio continuously for a plurality of engine cycles and operating at least one engine cylinder with a lean air-fuel ratio continuously for the plurality of engine cycles via a controller in response to an exhaust gas after treatment temperature being less than a threshold temperature, where the rich air-fuel ratio is a function of an amount of heat flux requested to be delivered to an exhaust gas after treatment system, and wherein a number of engine cylinders operating with the rich air-fuel ratio is based on an amount of heat flux generable via the engine operating with a maximum amount of spark retard at engine idle speed and an engine load.

2. The method of claim 1, where the richness of the rich air-fuel ratio is increased as the amount of heat flux requested increases.

3. The method of claim 1, where the richness of the rich air-fuel ratio is decreased as the amount of heat flux requested decreases.

4. The method of claim 1, further comprising increasing a load of the at least one engine cylinder with the rich air-fuel ratio as the amount of heat flux requested increases.

5. The method of claim 1, further comprising decreasing a load of the at least one engine cylinder with the rich air-fuel ratio as the amount of heat flux requested increases.

6. The method of claim 1, where the amount of heat flux requested is based on an initial temperature of the exhaust gas after treatment system.

7. The method of claim 1, where the amount of heat flux requested is based on a cylinder bank of an engine.

8. The method of claim 1, wherein the number of engine cylinders operating the rich air-fuel ratio is based on a difference between the amount of heat flux requested to be delivered to an exhaust gas after treatment system and the amount of heat flux generable with the maximum amount of spark retard.

9. A system for operating an engine, comprising:
an engine including an exhaust gas after treatment system; and
a controller including executable instructions stored in non-transitory memory to operate a first actual total number of engine cylinders with a rich air-fuel ratio continuously for a plurality of engine cycles and operate a second actual total number of engine cylinders with a lean air-fuel ratio continuously for the plurality of engine cycles, where the first actual total number of engine cylinders is based on each of a first amount of heat flux requested to be delivered to the exhaust gas after treatment system, a second amount of heat flux generable in a specified time frame via the engine operating with a maximum amount of spark retard at engine idle speed and an engine load, and a third amount of heat flux produced via one cylinder operating with a rich air-fuel ratio continuously for the plurality of engine cycles.

10. The system of claim 9, where the second actual total number of engine cylinders is based on the first amount of heat flux requested to be delivered to the exhaust gas after treatment system.

11. The system of claim 9, further comprising additional instructions to adjust spark timing of the first actual total number of engine cylinders differently from spark timing of the second actual total number of engine cylinders.

12. The system of claim 9, where the first actual total number of cylinders is equal to the second actual total number of cylinders.

13. The system of claim 9, where the first actual total number of cylinders is greater than the second actual total number of cylinders.

14. The system of claim 9, where the first actual total number of cylinders is less than the second actual total number of cylinders.

15. The system of claim 9, further comprising additional instructions to operate the engine with an on average stoichiometric air-fuel ratio.

16. The system of claim 9, further comprising additional instructions to operate the first actual total number of engine cylinders with an oscillating rich to lean and lean to rich air fuel ratio in response to a catalyst temperature exceeding a threshold temperature.

17. An engine operating method, comprising:
in response to an exhaust gas after treatment temperature being less than a threshold temperature, and upon an amount of heat flux requested to be delivered to the exhaust gas after treatment system being lower than a maximum heat flux attainable via only adjusting spark timing,
operating a first actual total number of engine cylinders with a rich air-fuel ratio continuously for a plurality of engine cycles and operating a second actual total number of engine cylinders with a lean air-fuel ratio continuously for the plurality of engine cycles via a controller, and adjusting a pattern of the first actual number of engine cylinders in response to the amount of heat flux requested to be delivered to the exhaust gas after treatment system, wherein the first actual total number of engine cylinders is based on a difference between the amount of heat flux requested to be delivered to the exhaust gas after treatment system and the maximum heat flux attained via only adjusting spark timing.

18. The method of claim 17, further comprising adjusting a pattern of the second actual number of engine cylinders in response to an amount of heat flux requested to be delivered to the exhaust gas after treatment system.

19. The method of claim 17, further comprising adjusting a load of the first actual total number of engine cylinders in response to the amount of heat flux requested to be delivered to the exhaust gas after treatment system.

20. The method of claim 17, further comprising adjusting a load of the second actual total number of engine cylinders in response to the amount of heat flux requested to be delivered to the exhaust gas after treatment system.

21. The method of claim 17, further comprising adjusting the richness of the rich air-fuel ratio in response to the amount of heat flux requested to be delivered to the exhaust gas after treatment system.

* * * * *